United States Patent Office.

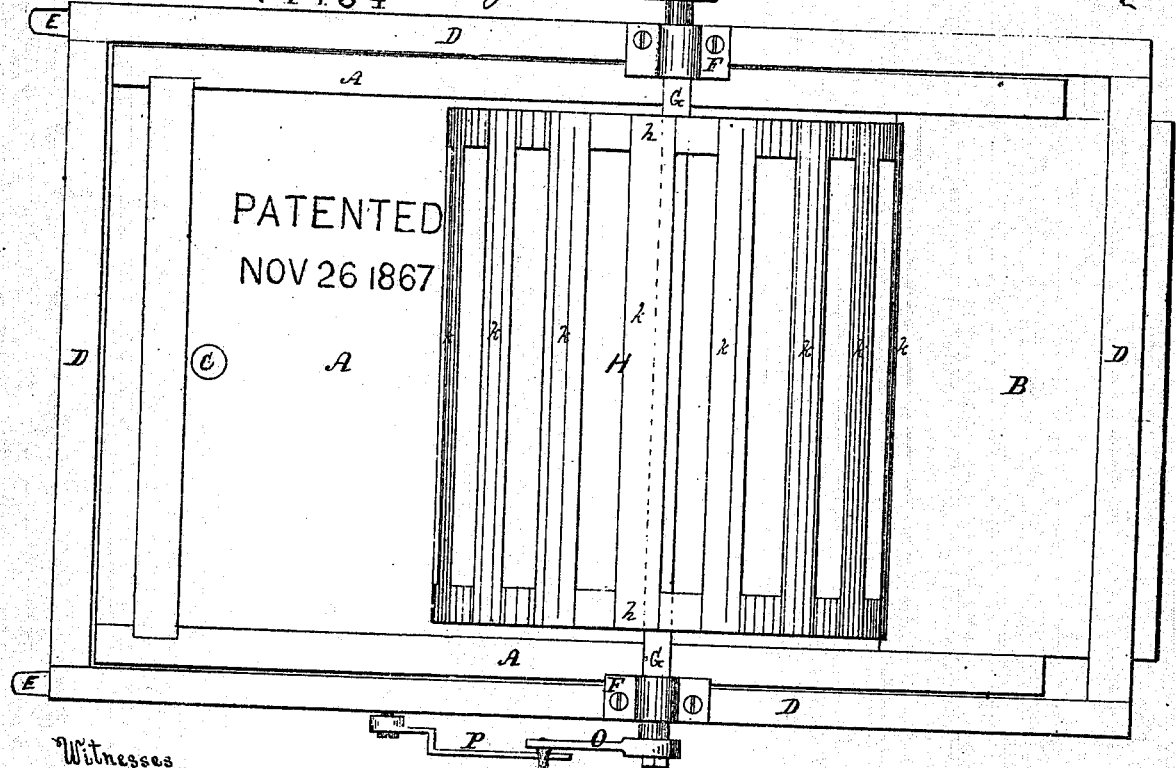
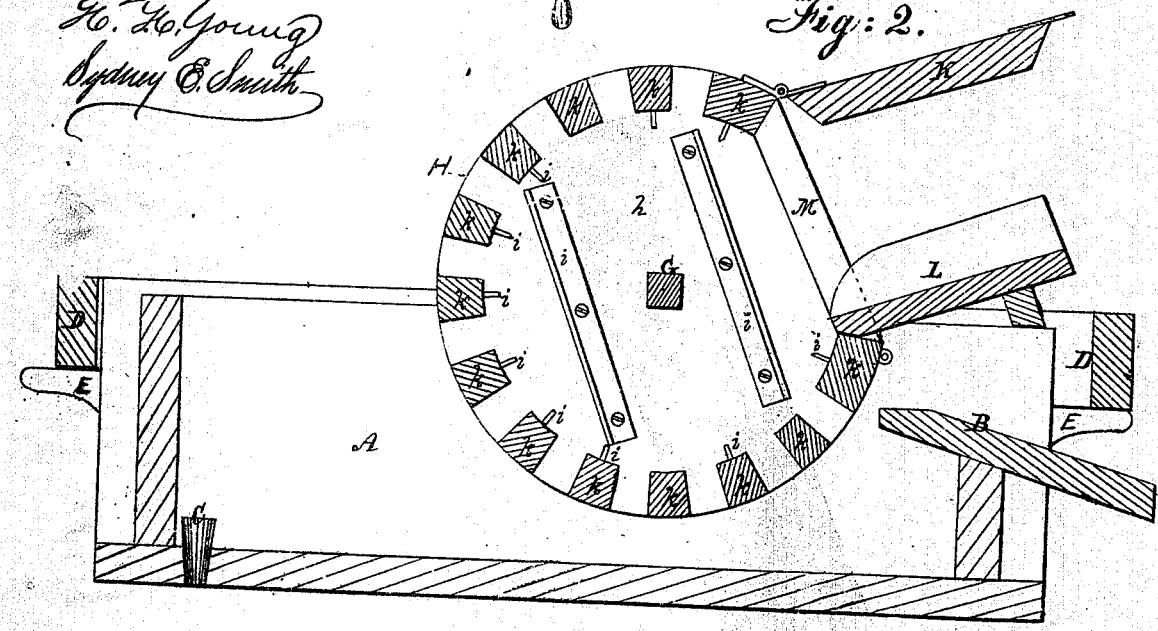

NAPOLEON BONAPARTE WHITE, OF CECIL COUNTY, ASSIGNOR TO HIMSELF AND FREDERICK B. HOFFMAN, OF BALTIMORE, MARYLAND.

Letters Patent No. 71,434, dated November 26, 1867.

IMPROVED MACHINE FOR SCALING FISH.

The Schedule referred to in these Letters Patent and making part of the same.

TO ALL WHOM IT MAY CONCERN:

Be it known that I, NAPOLEON B. WHITE, of Cecil county, State of Maryland, have invented a new and useful Machine for Scaling Fish; and I do hereby declare that the following is a full and exact description thereof, reference being had to the accompanying drawings, forming a part of this specification, and in which—

Figure 1 is a top view, and
Figure 2 a central longitudinal section of the machine.

The nature of my invention consists in the adaptation and employment of a revolving cylinder, of open or lattice-work, having projecting metallic blades arranged upon its inner periphery and sides, for the purpose of removing the scales from fish. I cause the cylinder, when filled with fish, to revolve within a reservoir of water, to prevent an accumulation or accretion of viscid matter therein.

The reservoir A, to contain the revolving cylinder, may be constructed in any suitable manner. Where it is convenient, I prefer to place it where a stream of running water may pass through it; otherwise, it is to be so arranged as that the water may be frequently changed therein.

In the accompanying drawings, A represents a tank or reservoir constructed of timber, provided with an apron or inclined shelf, B, at its front end, upon which the fish may be emptied from the machine. The tank is fitted with a cock for the discharge of water therefrom; or a simple hole, closed by a plug, C, may be pierced for the purpose. Upon the top of the tank A I place a removable frame, D, which fits closely and accurately over the sides of the tank, and rests upon cleats E secured thereto to support it. On this frame, about midway of its length, I place suitable journal-boxes, E, to receive the journals of an axle, G, which passes centrally through, and is rigidly connected with, a large hollow cylinder, H. This cylinder is constructed of solid head or end pieces $h\ h$, united by transverse bars $k\ k$, secured to their rims, and forming an open framework. Upon the inner face of each transverse bar $k$ (or of one or more of them) I secure a long metallic blade, $i$, to project inwardly therefrom along its entire length. The edge of each blade may be sharpened more or less, as shall be found expedient. I also secure similar inwardly-projecting blades $i\ i$ to the inner face of each head. The cylinder H is furnished with an opening, M, extending its entire length, and closed by a door, K, opening outwardly upon suitable hinges. I provide, also, a separate and removable way or inclined sluice-box, L, so made as to rest upon the frame D and fit into the opening M. The axle G of the machine may be provided at one end with a crank, O, or with a pulley, R, to connect with any suitable motive power. Where a crank, O, is employed, I employ a catch-latch, P, to engage the crank and serve as a stop to prevent the cylinder from revolving whilst it is being filled or emptied.

The operation of my machine is briefly as follows: Tank A containing water, the door K of the cylinder H being now thrown open, the detached sluice-box L is placed upon the frame, with its open end resting upon the edge of the opening M in the cylinder, so as to form an inclined trough leading into the cylinder. The cylinder is held in this position, and prevented from revolving, by means of the catch P engaging with the crank O of the cylinder. The fish to be scaled are thrown down the inclined way L into the cylinder until it is nearly filled. The inclined sluice or way L is then removed and the door K of the cylinder closed, and the cylinder is then made to revolve rapidly by any suitable motive power. The fish are thrown and drawn, by centrifugal force, over the blades $i\ i$ arranged upon its inner sides and circumference, which so engage therewith as to remove quickly the scales therefrom. The process is facilitated by the water in which the cylinder is partially immersed, which carries off the slime and detaches the scales loosened by the scraping-blades. So soon as the fish are scaled the cylinder is again secured by the catch P, the door K thrown open, and the clean fish thrown out upon the discharge-apron or shelf B of the tank.

The intervals between the slats $k$ enclosing the cylinder must be increased or diminished according to the size of the fish to be scaled. As the cylinders and their frames are detachable from the tank A, cylinders with various openings may be employed with the same tank for treating different kinds and sizes of fish.

The blades $k$, instead of being formed in one unbroken length from end to end of the cylinder, may be formed of a series of short blades, arranged in right lines and at different angles, and their edges, instead of being made straight, may be pointed or rounded.

Projecting wooden strips may serve as equivalents for the metallic blades $i$ in removing the scales of some fish.

Having thus fully described my invention, I claim therein as new, and desire to secure by Letters Patent—

A hollow cylinder provided with blades or points, or their equivalents, projecting inwardly from its circumference or sides, when made to revolve and otherwise adapted to the purpose of removing the scales from fish, substantially as herein set forth.

The foregoing specification of my improved machine for scaling fish, signed by me this twenty-second day of July, A. D. 1867.

NAPOLEON BONAPARTE WHITE.

Witnesses:
H. C. NESBITT,
GEORGE W. BROMFIELD.